(12) United States Patent
Zontrop et al.

(10) Patent No.: US 8,907,982 B2
(45) Date of Patent: Dec. 9, 2014

(54) MOBILE DEVICE FOR AUGMENTED REALITY APPLICATIONS

(75) Inventors: Pascal Zontrop, Aarschot (BE); Marc Bruno Frieda Godon, Londerzeel (BE)

(73) Assignee: Alcatel Lucent, Boulogne-Billancourt (FR)

( * ) Notice: Subject to any disclaimer, the term of this patent is extended or adjusted under 35 U.S.C. 154(b) by 55 days.

(21) Appl. No.: 13/129,488

(22) PCT Filed: Nov. 24, 2009

(86) PCT No.: PCT/EP2009/008430
§ 371 (c)(1),
(2), (4) Date: Jun. 17, 2011

(87) PCT Pub. No.: WO2010/063409
PCT Pub. Date: Jun. 10, 2010

(65) Prior Publication Data
US 2011/0254860 A1 Oct. 20, 2011

(30) Foreign Application Priority Data

Dec. 3, 2008 (EP) .................................... 08291135

(51) Int. Cl.
*G09G 5/00* (2006.01)
*A63F 13/219* (2014.01)

(52) U.S. Cl.
CPC ........... *A63F 13/04* (2013.01); *A63F 2300/301* (2013.01); *A63F 2300/69* (2013.01); *A63F 2300/1093* (2013.01); *A63F 2300/204* (2013.01)
USPC ........... 345/633; 345/632; 345/619; 345/158; 345/169

(58) Field of Classification Search
CPC ......... G06T 11/60; G06T 11/00; G06T 19/99; G06T 19/0006; G06F 3/0346; G06F 3/0304; G06F 3/038; G06F 1/1626; G06F 1/169; H04M 1/23; H04N 5/272

USPC ............. 345/619, 632, 633, 158, 169, 8, 419; 715/740, 864, 810; 709/204; 382/103; 463/39

See application file for complete search history.

(56) References Cited

U.S. PATENT DOCUMENTS 6,020,891 A * 2/2000 Rekimoto ...................... 345/419
6,653,990 B1 * 11/2003 Lestruhaut ......................... 345/8

(Continued)

FOREIGN PATENT DOCUMENTS

EP 1600902 A1 11/2005
JP 2005-242725 9/2005

(Continued)

OTHER PUBLICATIONS

Raskar, R. et al., "Table-Top Spatially-Augmented Reality: Bringing Physical Models to Life with Projected Imagery", IEEE, 1999, p. 1-8.*

(Continued)

*Primary Examiner* — Chante Harrison
(74) *Attorney, Agent, or Firm* — Harness, Dickey & Pierce

(57) ABSTRACT

The mobile device includes a visual input device, for capturing external visual information having real visual background information, and a processing device. The processing device is for associating a selected application with the external visual information, and for executing the selected application based on the external visual information and on user-related input information. The processing device for generating a visual output signal related to at least one virtual visual object in response to the application is further configured to provide the visual output signal to a projector device included within the mobile device such that the projector device will be configured to project said visual output signal related to the at least one virtual visual object onto the visual background, thereby modifying said external visual information.

9 Claims, 6 Drawing Sheets

(56) References Cited

U.S. PATENT DOCUMENTS

Figure 1:
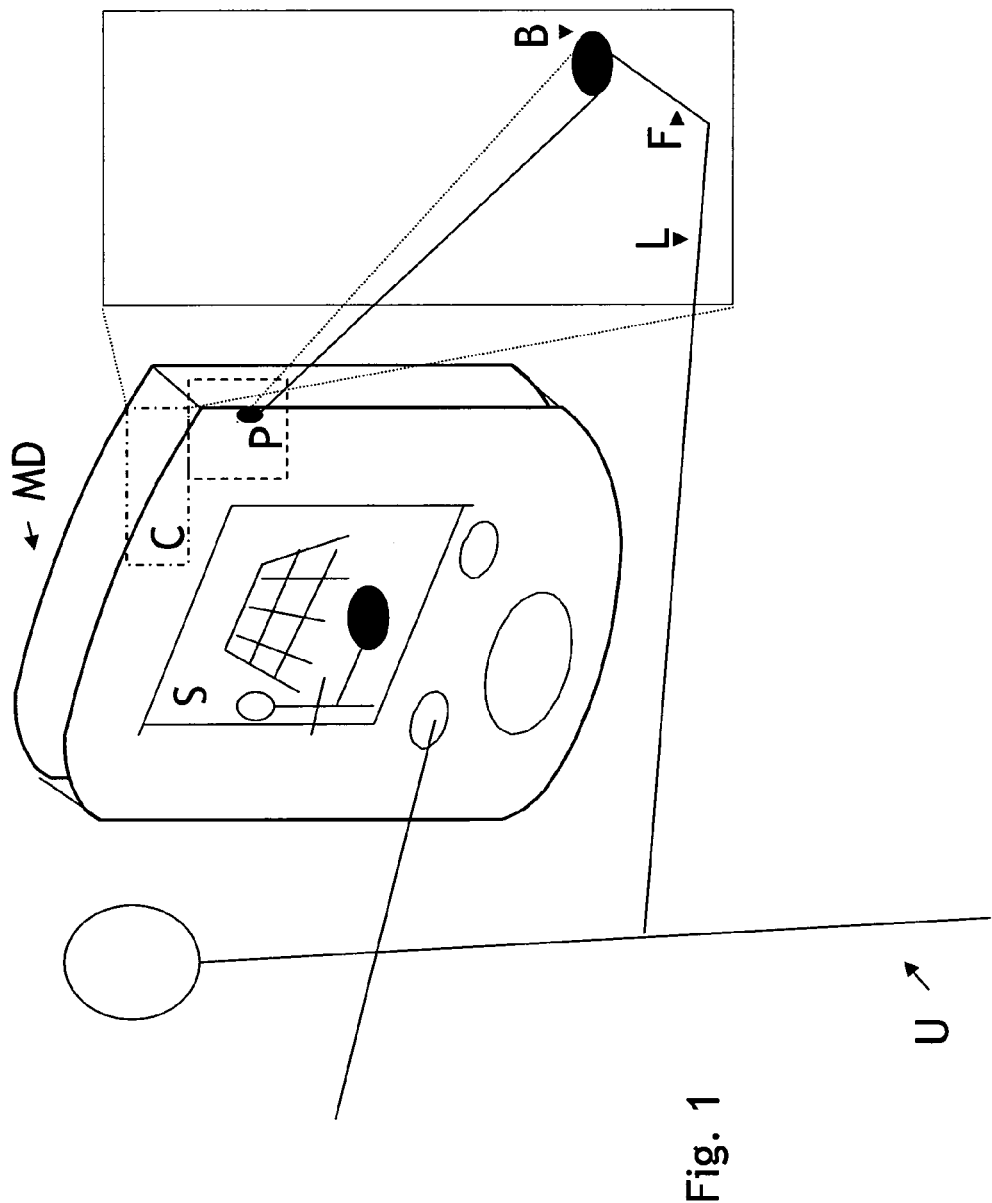

| | | |
|---|---|---|
| 7,377,650 B2 | 5/2008 | Simon |
| 2004/0102247 A1 | 5/2004 | Smoot et al. |
| 2005/0282623 A1 | 12/2005 | Matsuno et al. |
| 2008/0094417 A1* | 4/2008 | Cohen ............................ 345/632 |
| 2008/0194323 A1 | 8/2008 | Merkli et al. |
| 2008/0267450 A1* | 10/2008 | Sugimoto et al. ............. 382/103 |
| 2009/0066690 A1* | 3/2009 | Harrison ........................ 345/419 |
| 2010/0017722 A1* | 1/2010 | Cohen ............................ 345/632 |
| 2010/0287500 A1* | 11/2010 | Whitlow et al. ............... 715/810 |
| 2010/0289817 A1* | 11/2010 | Meier et al. .................... 345/619 |
| 2011/0292076 A1* | 12/2011 | Wither et al. .................. 345/632 |
| 2012/0086727 A1* | 4/2012 | Korah et al. ................... 345/633 |
| 2012/0194517 A1* | 8/2012 | Izadi et al. ..................... 345/420 |
| 2012/0218299 A1* | 8/2012 | Hayakawa .................... 345/633 |
| 2012/0231887 A1* | 9/2012 | Lee et al. ........................ 463/39 |
| 2012/0331058 A1* | 12/2012 | Huston et al. .................. 709/204 |
| 2013/0169682 A1* | 7/2013 | Novak et al. ................... 345/633 |
| 2014/0002359 A1* | 1/2014 | Weising et al. ................ 345/158 |

FOREIGN PATENT DOCUMENTS

| | | |
|---|---|---|
| JP | 2006513509 A | 4/2006 |
| WO | WO-2006105686 A1 | 10/2006 |

OTHER PUBLICATIONS

International Search Report from PCT/EP2009/008430 dated Feb. 23, 2010.

Office Action for Japanese Application No. 2011-538878 dated Sep. 10, 2013 and English translation.

* cited by examiner

Application INPUT
```
<image>
  <vvos>
    <vvo id="ball">
      <position x="33" y="336" />
    </vvo>
    <vvo id="score">
      <position x="0" y="0" />
    </vvo>
  </vvos>
  <vbis>
    <vbi id="background" kind="grass">
      <movement x="3" y="6" />
    </vbi>
    <vbi id="foot" kind="player">
      <movement x="146" y="3" />
    </vbi>
  </vbis>
```

Application OUTPUT
```
<image>
  <vvos>
    <vvo id="bal" projected="true" onscreen="true" kicked="false">
      <position x="33" y="336" />
    </vvo>
    <vvo id="score" projected="true" onscreen="true" score="3-0">
      <position x="0" y="0" />
    </vvo>
    <vvo id="goal" projected="false" onscreen="true">
      <position x="154" y="895" />
    </vvo>
  </vvos>
</image>
```

Fig. 3

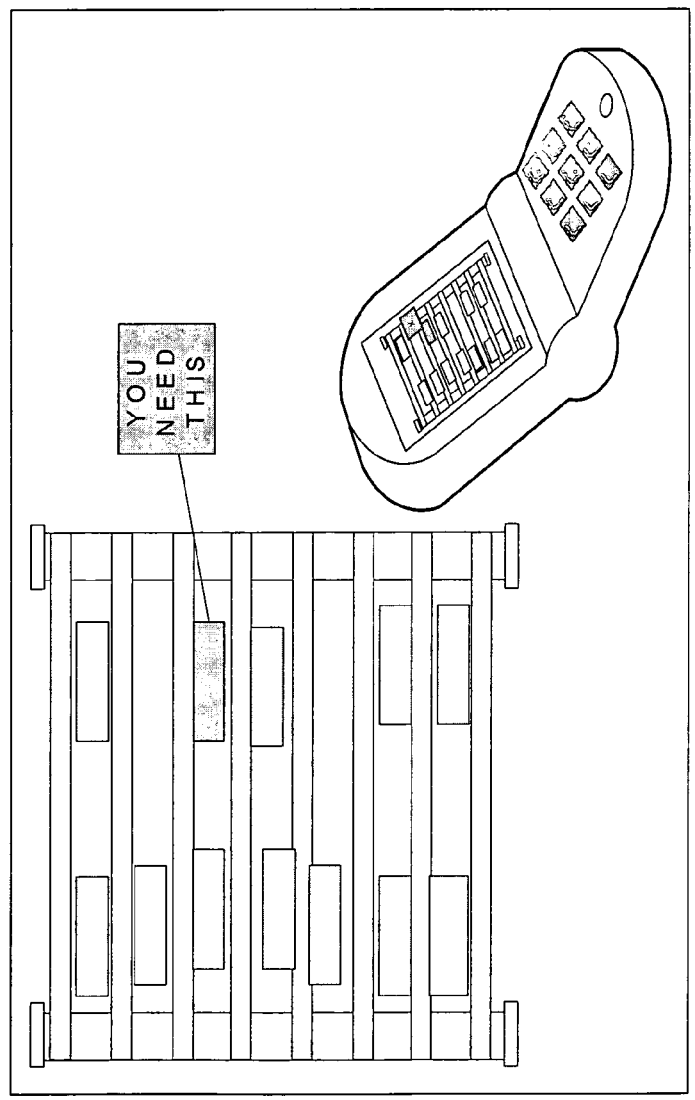

MOBILE DEVICE FOR AUGMENTED REALITY APPLICATIONS

The present invention relates to a mobile device for augmented reality applications as set out in the preamble of claim 1.

PCT application PCT/CH2006/000196 discloses a mobile device including a camera, a control module for associating a selected application with the external visual information and for initiating execution of the selected application based on the visual background information and the orientation of the mobile device. The orientation of the mobile device with respect to the visual background can be considered as user-related input information, as it relates to the way the user is positioning the mobile device. The prior art mobile device further includes an output generator for generating visual output signals in response to said application and for providing these visual output signals to a display of the mobile device.

In case the mobile device is e.g. a mobile phone, the prior art solution thus foresees in showing augmented reality pictures, comprising the real visual background, augmented with some virtual objects resulting from the application, on the display of the mobile phone. This means that this augmented reality is only visible on this small screen of the cell phone. In case of a gaming application, a small screen may seriously limit the gaming experience. In case a laptop is used as mobile device, the display is already much larger, but even then the user experience may be limited as for some applications it might be more desirable to have a more active participation of the user, involving some physical movements of the user, which are inherent to e.g. the game itself. This might for instance be the case in football games where a user might want to more actively participate, not only by manually controlling some control buttons on the mobile device itself, but by e.g. performing the movement of kicking, stopping or countering a football.

It is thus an object of the present invention to provide a mobile device of the above known kind, but which is capable of solving the problems associated to the prior art devices.

To this purpose the mobile device according to the present invention further includes features as set out in the characterizing portion of the first claim.

The projector device included in the mobile terminal will thereby be able to project some virtual visual objects onto the real visual background. In case of the above mentioned example of the football game, this virtual visual object may then be a virtual football which will be projected on the floor the player is currently standing while playing. By means of a projected ball on the floor, to which a user may perform the acts of kicking, the player can then have a more exciting gaming experience which was the object of this invention: to have a much more active game participation and to enrich the human/device interface. The projector of the mobile device only needs to project the virtual visual objects to the background, and therefore only needs to receive from the processing device this virtual visual object information. The processing device is therefore adapted to provide this type of signal to this projector. By projecting this virtual visual object to the background, the external visual background information will of course change in response to the application itself.

Another characteristic feature of the present invention is set out in claim 2. In this case the user-related input information comprises visual information, such as for instance an image of the foot of the football player, which is included in said background information. This user-related information may as well comprise movement information detected by a movement detector incorporated within said mobile device and adapted to detect a movement of the mobile device with respect to the background, e.g. by determining an orientation of said mobile device with respect to said visual background information.

Additional features of the present invention are set out in the pending claims. By discriminating, from said external visual information received from said visual input device (C), real visual background information and virtual visual objects, and by consecutively extracting metadata information from them, a universal platform allowing to plug in several applications on the mobile device is realized.

The pending claims state that in some embodiments the processing device is adapted to generate a second visual output signal related to said virtual visual objects for provision to a display comprised in said mobile device. In some of these embodiments the virtual visual object will then also appear on the screen of the mobile device. In other embodiments this processing device is further adapted to generate said second visual output signal as comprising at least one other virtual visual object. This can for instance be the case in the aforementioned football game, wherein the screen of the mobile device can only indicate the player's score on a virtual scoreboard, whereas the virtual football is only projected on the floor. In yet other embodiments the processing device is further adapted to generate said second visual output signal as comprising said virtual visual objects overlaying at least one other virtual visual object generated by said application and/or the visual background information. In the example of the aforementioned football game, the display of the mobile device can then show the football, together with a virtual goal, a virtual scoreboard and possibly also the floor the user is standing on and on which the virtual football is projected. Other combinations can also be envisaged.

Figure 2:
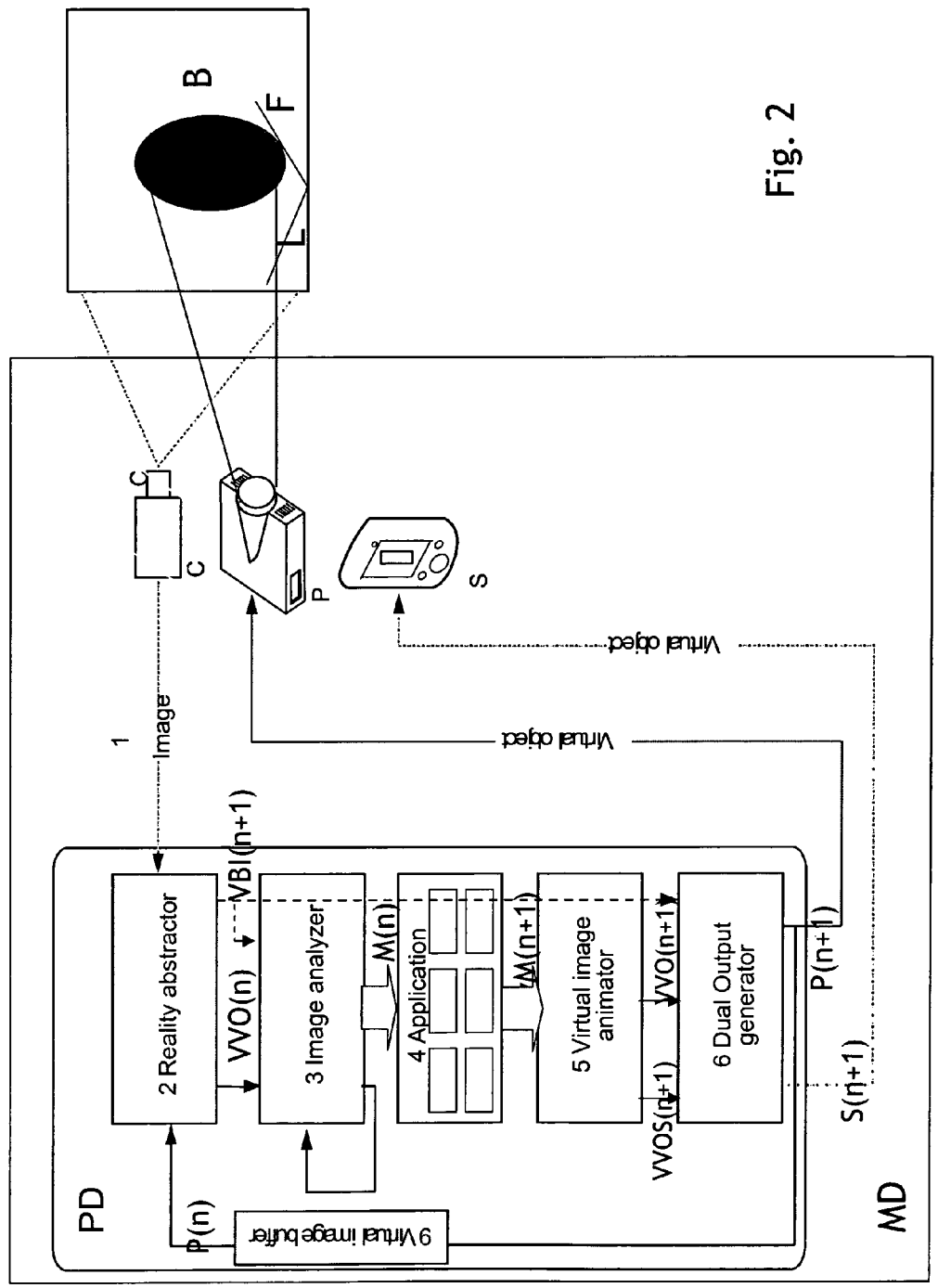
Figure 4:
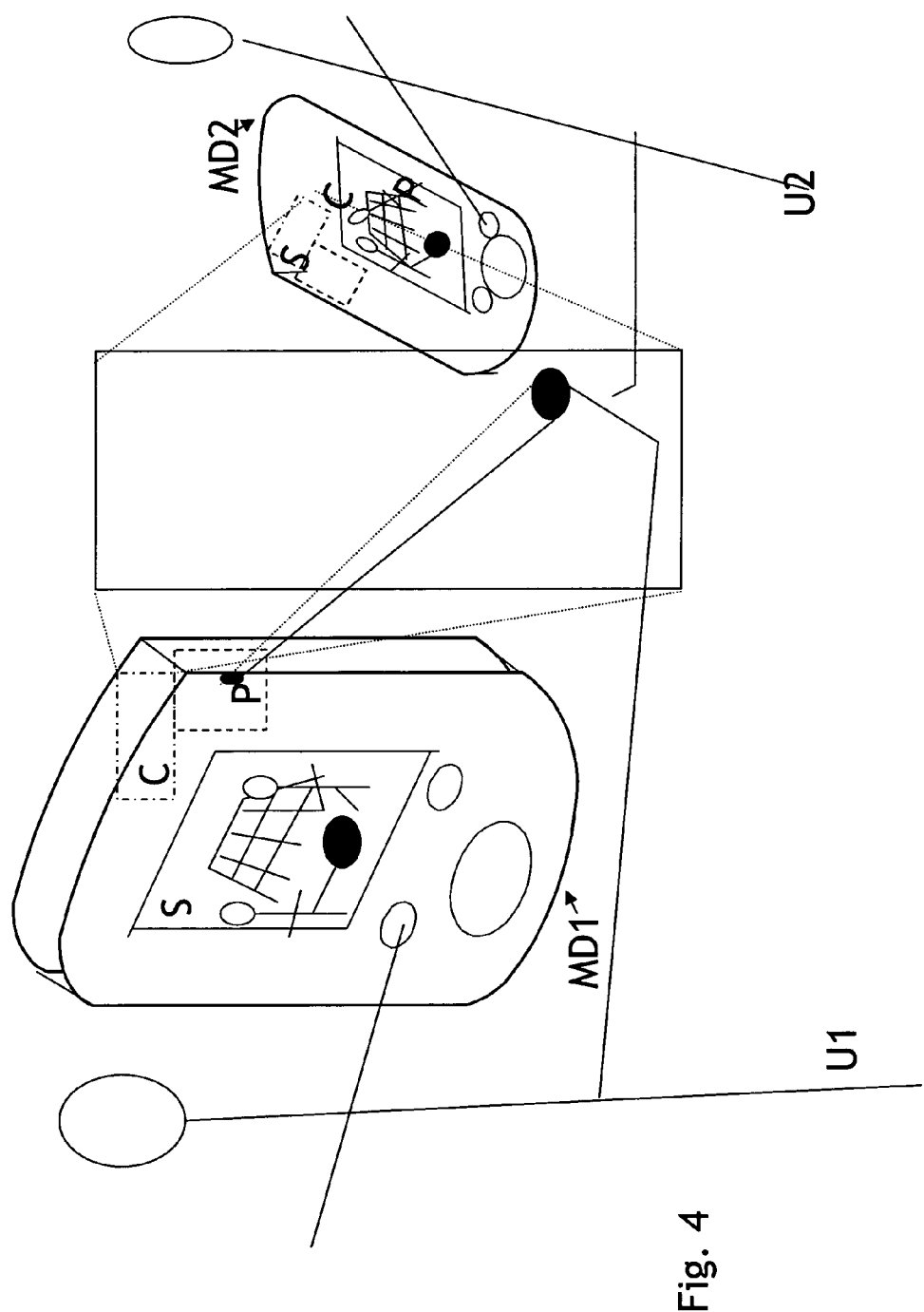
Figure 5:
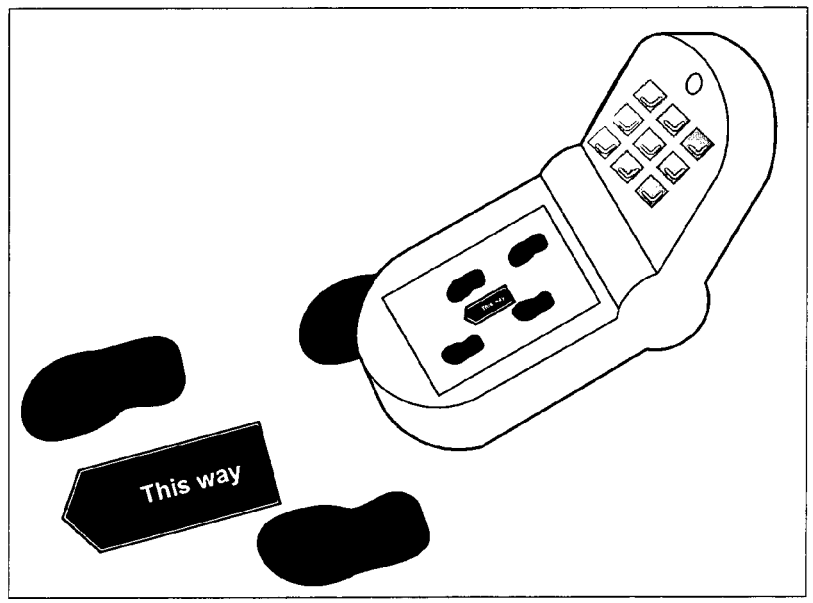

The above and other objects and features of the invention will become more apparent and the invention itself will be best understood by referring to the following description of an embodiment taken in conjunction with the accompanying drawings wherein:

FIG. 1 schematically represents one player U playing a football game using a mobile device MD according to the invention, FIG. 2 gives a possible detailed implementation of an embodiment of a mobile device MD according to the invention, FIG. 3 shows some an example of the metadata generated by the image analyzer and application engine of the processing device of FIG. 2, FIG. 4 schematically depicts a multiplayer situation of two players using mobile devices MD1 and MD2 according to the invention, FIG. 5 schematically depicts another application running on a mobile device according to the invention, and FIG. 6 schematically depicts yet another application running on a mobile device according to the invention.

The present invention relates to mobile devices for augmented reality applications. These mobile devices may be comprised in the following non-exhaustive list of mobile devices as mobile phones, personal digital assistants, mobile computers such as laptops, tablet computers, gaming consoles, GPS terminals, etc. In general any portable device able to capture visual information, to process this visual information for use in applications and to project virtual objects onto a background as will be explained in the following paragraphs may be used for implementing the invention.

FIG. 1 depicts an embodiment of such a mobile device MD, operated by a user U. The mobile device MD comprises a visual input device C such as a camera, a digital imaging system, CCD sensors, etc. . . . able to capture external visual information itself comprising real visual background information, abbreviated with VBI. This real visual background information is generally referred to as information coming from the "real" world, in contrast to visual information generated by e.g. software applications, which visual information will be denoted by virtual visual objects, abbreviated as WO. In the situation depicted in FIG. 1 where a user U is playing a game on his/her mobile device MD, this real visual background information comprises the visual information captured by the camera, which in this example might be heading towards the floor the user in standing on. The real visual background information VBI will then comprise the floor image, together with part of the leg L and/or foot F of the user U. This information of the foot F and leg L of the user is user-related input information, in this case thus being part of the real visual background information, which will be used by the application running on the mobile device, as will be explained in a next paragraph.

FIG. 1 also shows that the camera is not only capturing this "real" background information, but also an image of a projected football B. This projected football B is not a projected image of a "real" football, but is a projected image of a virtual football, which itself is a result of an application such as a game, running on a processing device PD, internal to the mobile device MD, and therefore not shown on FIG. 1. In the depicted example this game is a football game, which uses as input the external visual information, so both the real visual background information VBI, in this case thus also comprising user-related information, as well as the projected virtual object information, in this case consisting of the projected football. Depending on the position of the foot of the user with respect to the projected ball B, the next state and output as generated by the game will be updated. In the example of a football game this may mean that the game provides a next state which may either indicate that the user has scored, or has kicked the ball outside a virtual goal, which, in the embodiment depicted in FIG. 1 is only displayed on the screen S of the mobile device. This virtual goad is itself another virtual visual object as this again does not correspond to a "real" physical goal. The processing device therefore has to continually update the parameters of the game, which themselves depend on the captured external visual information, calculate the new position of the ball within the game, and send updated visual information back to a projecting device P enabling the latter to project this virtual ball to an updated position. This updated projecting position is, in this case, also depending on the relative position of the mobile device with respect to the real visual background. This relative position as well relates to user-related input information. Such position information may be detected by a movement detector incorporated in the mobile device, but alternatively this movement information can also be extracted by imaging techniques on performed on the external visual information by comparing previously captured images with each other. This will be further explained in the next paragraphs.

The projecting device P incorporated in the mobile device MD can be a mini-projector as presently known in the art. In any case an updated picture or image of the virtual ball will be projected on an updated position on the floor.

In some embodiments of the invention, only the projector device P displays one or more virtual visual objects. In other embodiments, the virtual visual object will not only be projected by the projector device P, but also be shown on the screen S of the mobile device. And in yet other embodiments, the screen S will show several virtual visual objects, such as depicted in the example shown in FIG. 1. In this embodiment a virtual ball, as well as a virtual goal, as well as a generated, and thus virtual, image of the player are displayed on the screen. In yet other embodiments also information from the real visual background e.g. the legs and feet as captured by the camera, as well as one or several virtual visual objects will be displayed on the screen.

FIG. 2 shows a more detailed view of a possible embodiment of the processing device PD, incorporated in the mobile device MD. It is to be remarked that many other embodiments of the processing device PD are possible, and this FIG. 2 gives only a schematic view of some main blocks and processing steps to be executed in this specific embodiment. Such a processing device PD may be implemented by means of a dedicated processor, or by means of embedded software on a general purpose processor, or via an ASIC, etc, as is well known by a person skilled in the art. The different blocks are thus only meant for illustrative purposes. Other embodiments where just one single processing device is performing all steps, are as well possible.

FIG. 2 further shows in a very schematic way different building blocks of the mobile device: a visual input device C, in FIG. 2 being depicted as a camera, a projector device, in FIG. 2 being depicted as a "traditional" projector P, and a display S, in FIG. 2 depicted as the screen of a mobile phone. The embodiment of the processing unit PD of the mobile device MD depicted in FIG. 2 further contains several functional blocks: a reality abstractor 2, an image analyzer 3, an application engine 4, a virtual image animator 5, a dual output generator 6 and a virtual image buffer 9. This dual output generator is only present in these embodiments generating a dual output, so one to the projector P, and another one to the screen S. In some embodiments of the mobile device, a single output generator, adapted to only generate a single image which is to be sent to the projector P, is incorporated.

The reality abstractor, block 2, is a module adapted to split the incoming external visual information denoted "image" and being provided by the camera C, into the real visual background information VBI and the virtual visual objects VVO. To discriminate between the virtual visual objects previously generated by the application engine and the ones to be generated in the present cycle of the application, the notation VVO(n) will be used for the previously generated and previously projected one, and VVO(n+1) for the updated one generated and to be projected in the actual cycle. In some embodiments at start-up no virtual visual object information is available. In that case the incoming image entirely consists of real visual background information. To split the incoming external visual information the reality abstractor needs to know what the projected image of the virtual object or objects looks like. Apart from the incoming image at start-up which initially may not contain any virtual image, during all other image captions this projected image P(n) was created by the Dual output generator in a previous cycle and was temporarily stored or buffered in a Virtual image buffer 9. After getting the stored projected image from the buffer the reality abstractor tries to find the same patterns in the image of the camera. This can be done via image recognition techniques, as is known by a person skilled in the art. When finding these patterns, the reality abstractor may also abstract some information as to how the mobile device is positioned in relation to the background (through the scaling of the projected image), but this is optional. When it recognizes a pattern and possibly derives the scaling information it can subtract the whole virtual image from the total image, thereby deriving the real visual background information and send both the virtual projected incoming image VVO(n) as captured by the camera, and the real background information VBI(n+1), as this concerns already the new and actual information, as separate information to the Image analyzer 3. At start-up the virtual image buffer is generally empty, so the input image will correspond to the real visual background information, so the WO signal does not contain any relevant information at that moment.

The next module within the embodiment of the processing device, the Image analyzer 3, is adapted to receive the captured virtual visual object information WO of the incoming image and the captured real visual information VBI as provided by the reality abstractor 2. The main function of the image analyzer is to extract and/or to generate metadata out of these images. To this purpose several iterations may be required such as to improve the results. This is indicated by means of the feedback arrow of the image analyzer in FIG. 2. Techniques for extracting metadata are known to a person skilled in the art and may comprise pattern recognition, digital geometry and/or signal processing.

In this context metadata as to be understood in this document are parameters having a certain semantic meaning. Examples for the football game may be: object=ball; background=floor, . . . and are shown in FIG. 3. In order to generate such metadata the image analyzer may thus also be adapted to analyse the changes in the background, and to derive therefrom specific actions that have happened in front of the camera. These actions may be the movement of the legs/feet of the user in the case of the football game. Alternatively this movement information may be provided by a movement detector. Image analyzer 3 is then further adapted to generate such metadata in a format that applications that can run on this processing device will understand, such as e.g. the XML format shown in FIG. 3. The metadata output, denoted by the thick arrow and M(n) on FIG. 2, generated by the image analyser thus contains information valuable for and understandable by the application, for example information indicating that the foot has been moved towards the ball at a 7 degree angle.

The metadata M(n) generated by the image analyzer is then provided to an application engine 4. On this application engine several applications can run. Such an application generally comprises compiled software that could be possibly have been written by third party developers. This application is adapted to understand the format of the inputted information coming from the Image analyzer. Alternatively some conversion module, for converting certain input formats into the formats understandable by the application, can be provided.

In the previously described example of a football game, this football game thus corresponds to the application. Several other applications will be described in further paragraphs. As these applications are generally widespread and known by a person skilled in the art, their internal operation will not be further discussed within this document.

The output generated by the application generally comprises updated metadata M(n+1) comprising information related to the updated virtual visual objects which finally need to be projected to the real background. FIG. 3 shows an example of the metadata input to the application, and the metadata being generated by the application.

In the embodiment depicted in FIG. 2 this updated metadata M(n+1) as generated and provided by the application engine 4 is first provided to a next module being the Virtual image animator 5.

This Virtual image animator 5 is adapted to receive the updated metadata information signal M(n+1) as provided by the application engine and is further adapted to generate therefrom the adapted virtual visual object or objects VVO(n+1) to be displayed in accordance to what was determined by the application engine as corresponding to the actual state or cycle of the application. In the case of the already described football game, only one virtual object is projected. However in many other applications, including football games, several virtual visual objects may be projected, e.g. a virtual ball and a virtual goal. The virtual objects to be projected on the floor, in this embodiment comprising an image having the form of a ball, are then further passed on to the Dual or single output generator, depending on the specific embodiment of the mobile device. The depicted embodiment of FIG. 2 however shows a mobile device MD of which the projector is projecting a virtual football image to the background, but of which the display of the mobile device itself is also displaying another virtual visual object, in this embodiment being a virtual scoreboard. To this purpose an additional virtual visual object VVOS(n+1) is to be generated by the virtual image animator; in this embodiment this additional virtual visual object thus having the form of a scoreboard. As the image to be displayed on the screen is different from the one to be projected, a dual output generator is included in the embodiment of FIG. 2. Even if the same virtual visual object were to be shown both on the screen and projected to the background, also a dual output generator is to be included in the processing device, as two separate images need to be generated: one for being projected, another one for being displayed to a screen of a mobile device.

The Dual output generator 6 is thus responsible for generating the output signals for both the screen or display S of mobile device MD itself on one hand, and for the beamer or projecting device P on the other hand. As the image generated by the virtual image generator just contains basic shape information, e.g. the basic shape of a ball, the output generator is responsible for tuning this image to the correct size, positioning this to its correct position such that the projector can correctly project it onto the background. This means that in this embodiment this dual output generator has to receive both the latest virtual objects VVO(n+1) and VVOS(n+1) and the latest visual background information VBI(n+1), and to further process them to provide a first output signal S(n+1) to be sent to the display, and a second output signal P(n+1) for provision to the projection device P. In the depicted embodiment S(n+1) mainly relates to VVOS (n+1) whereas P(n+1) mainly related to VVO(n+1). However in other embodiments the output signal to be sent to the display may be composed of VVO(n+1) and other virtual objects as a virtual scoreboard which are not projected on the real background, but only shown on the display. Alternatively also some information with respect to the real background, such as the foot or leg of the user, in addition to some virtual football playground, virtual goal and virtual scoreboards, may be shown on the screen too. Many other possibilities can be envisaged, mainly depending upon the applications itself as is known by a person skilled in the art.

For the generation of the output P(n+1) to be sent to the projecting device P for projection of the virtual objects onto the background itself this Dual output generator 6 always gets the latest real background VBI(n+1) straight from the reality abstractor 2. This means that the background input is almost real-time. For the projected augmented reality virtual object image P(n+1) the dual output generator needs to make sure that the correct virtual objects are projected onto the real background at the correct location in the correct size. It can do this by comparing the newest background with the previous one. This previous one can be stored in an internal buffer of the dual output generator and is not shown in the drawing.

This comparison step can be performed together with a calculation of the movement the camera has made as the device has to make sure that the coordinates and the size of the projected image are exact. This is because the size and coordinates have to constantly be adjusted because of possible movements of the device so that for instance the projected virtual image is not too big when the mobile device is held closer to the real object (keeping in mind the projection opening angle). Alternatively this movement information may be obtained from the image analyzer, or from a separate movement or orientation detector.

Of course alternative embodiments are possible. Instead of feeding back the updated virtual object image to a buffer, also the generated metadata may be fed back to an alternative buffer. In that case the reality abstractor then needs to incorporate some of the functionality of the virtual image animator and of the dual output generator such as to generate the latest projected virtual object, for further comparison with the incoming image. Still other embodiments are possible, as is known by a person skilled in the art.

FIG. 4 depicts the situation of a multiplayer experience where two users U1 and U2 are now playing this football game on their respective mobile devices MD1 and MD2, and are thus trying to kick the virtual projected ball towards a goal, which, in this embodiment is shown in the displays on their respective mobile terminals. Alternatively this virtual goal can also be projected on the floor. In this either case the mobile devices need to be further equipped with communication tools enabling for multiplayer applications, as is well known by a person skilled in the art.

Apart from the already mentioned example of a football game other applications may use the present method and embodiments. Amongst these we have the application where the projector can, by projecting footsteps to the background, indicate the direction a person has to follow when e.g. he/she is to find a railway station. In this case the method does not improve a gaming experience but is used to enrich and clarify the human computer interface. The mobile device then can guide people in a more intuitive way. This is schematically depicted in FIG. 6.

Another application concerns highlighting, by the projecting device of the mobile phone, in a shelf in a shop only the items that are on a user's shopping list. This is schematically depicted in FIG. 7.

Yet another example may consist of projecting a virtual keyboard on a table, which a user can then "hit" or "push" so as to form a text on the screen. This keyboard may as well concern a keyboard of a piano, which a user can "play" so as to generate the appropriate associated sound.

Yet another example consists of projecting a virtual ping-pong ball on a playground, e.g. a table. By tilting the mobile device, a user can "hit" the virtual ball by its mobile device. In this case the input information comprises movement and orientation information of the mobile device, e.g. a mobile phone, with respect to the fixed background, and with respect to the projected ball. This ping-pong application may of course also be realized as a multiplayer game.

While the principles of the invention have been described above in connection with specific apparatus, it is to be clearly understood that this description is made only by way of example and not as a limitation on the scope of the invention, as defined in the appended claims. In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for, and unless otherwise specifically so defined, any physical structure is of little or no importance to the novelty of the claimed invention. Applicant thus regards any means which can provide those functionalities as equivalent as those shown herein.

The invention claimed is:

1. A mobile device comprising:
a visual input device configured to capture external visual information comprising information associated with a real visual background; and
a processing device configured to,
associate a selected application with the external visual information, execute the selected application based on the external visual information and on user-related input information,
generate a visual output signal related to at least one virtual visual object in response to said application,
provide said visual output signal to a projector device included within said mobile device such that said projector device is configured to project said visual output signal related to said at least one virtual visual object onto said real visual background, thereby modifying said external visual information,
distinguish from said external visual information received from said visual input device, said information associated with said real visual background and at least one virtual visual object earlier projected onto said background, and
generate a next visual output signal for the at least one virtual visual object based on the distinguished real visual background information and the at least one virtual visual object earlier projected onto said background.

2. The mobile device according to claim 1, wherein said user-related input information comprises visual information included in said real visual background information.

3. The mobile device according to claim 1, wherein said user-related input information comprises movement information detected by a movement detector incorporated within said mobile device and configured to determine a movement of said mobile device with respect to said real visual background.

4. The mobile device according to claim 1, wherein said processing device is further configured to analyze said at least one virtual visual object and said real visual background information so as to determine from said at least one virtual visual object and said real visual background information, metadata information.

5. The mobile device according to claim 4, wherein said processing device is further configured to execute said selected application based upon said metadata information.

6. The mobile device according to claim 1, wherein said processing device is further configured to generate a second visual output signal related to said at least one virtual visual object for provision to a display comprised in said mobile device.

7. The mobile device according to claim 6, wherein said processing device is further configured to generate said second visual output signal as comprising said at least one virtual visual object overlaying said real visual background information.

8. The mobile device according to claim 1, wherein said processing device is further configured to generate said second visual output signal as comprising at least one other virtual visual object.

9. The mobile device according to claim 6, wherein said processing device is further configured to generate said second visual output signal as comprising said at least one virtual visual object overlaying said at least one other virtual visual object generated by at least one of said application and said real visual background information.

* * * * *